(12) United States Patent
Prokoski

(10) Patent No.: US 7,822,263 B1
(45) Date of Patent: Oct. 26, 2010

(54) METHOD AND APPARATUS FOR ALIGNMENT, COMPARISON AND IDENTIFICATION OF CHARACTERISTIC TOOL MARKS, INCLUDING BALLISTIC SIGNATURES

(76) Inventor: Francine J. Prokoski, 8721 Mountain Valley, Fairfax Station, VA (US) 22039

(*) Notice: Subject to any disclaimer, the term of this patent is extended or adjusted under 35 U.S.C. 154(b) by 0 days.

(21) Appl. No.: 12/578,570

(22) Filed: Oct. 13, 2009

Related U.S. Application Data

(63) Continuation-in-part of application No. 11/319,230, filed on Dec. 28, 2005, now Pat. No. 7,602,938.

(51) Int. Cl.
*G06K 9/00* (2006.01)
*G06K 9/54* (2006.01)

(52) U.S. Cl. .................. 382/152; 382/154; 382/305

(58) Field of Classification Search ......... 382/141–152, 382/100, 305, 154, 106, 124–125, 203–205, 382/216–218, 115; 707/1–7, 104.1; 356/390; 702/166–167, 182; 250/328–330
See application file for complete search history.

(56) References Cited

U.S. PATENT DOCUMENTS

| | | | | |
|---|---|---|---|---|
| 5,390,108 A | * | 2/1995 | Baldur et al. | 702/167 |
| 6,173,068 B1 | * | 1/2001 | Prokoski | 382/115 |
| 6,327,032 B1 | * | 12/2001 | Lajeunesse et al. | 356/390 |
| 6,505,140 B1 | * | 1/2003 | Bachrach | 702/166 |
| 6,606,115 B1 | * | 8/2003 | Alicandro et al. | 348/164 |
| 6,785,634 B2 | * | 8/2004 | Bachrach et al. | 702/182 |
| 7,212,949 B2 | * | 5/2007 | Bachrach | 702/182 |
| 7,602,938 B2 | * | 10/2009 | Prokoski | 382/100 |

\* cited by examiner

*Primary Examiner*—Sherali Ishrat
(74) *Attorney, Agent, or Firm*—Whitham, Curtis, Christofferson & Cook, P.C.

(57) ABSTRACT

Systematic use of infrared imaging characterizes marks made on items and identifies the particular marking tool with better accuracy than use of visual imaging. Infrared imaging performed in total darkness eliminates shadows, glint, and other lighting variations and artifacts associated with visible imaging. Although normally used to obtain temperature measurements, details in IR imagery result from emissivity variations as well as thermal variations. Disturbing an item's surface texture creates an emissivity difference producing local changes in the infrared image. Identification is most accurate when IR images of unknown marks are compared to IR images of marks made by known tools. However, infrared analysis offers improvements even when only visual reference images are available. Comparing simultaneous infrared and visual images of an unknown item, such as bullet or shell casing, can detect illumination-induced artifacts in the visual image prior to searching the visual database, thereby reducing potential erroneous matches. Computer numerically controlled positioning of the toolmark relative to imaging sensors which use fixed focus optics with shallow depth of focus, varying focus distance and orientation systematically to construct a sequence of images, maximizes reliability of resulting images and their comparisons.

6 Claims, 14 Drawing Sheets

METHOD AND APPARATUS FOR ALIGNMENT, COMPARISON AND IDENTIFICATION OF CHARACTERISTIC TOOL MARKS, INCLUDING BALLISTIC SIGNATURES

RELATED APPLICATIONS

This application is a continuation in part from, and claims priority from, U.S. patent application Ser. No. 11/319,230 now U.S. Pat. No. 7,602,938 Dec. 28, 2005 of the same title, which in turn claims priority from U.S. patent application Ser. No. 09/329,217 (now U.S. Pat. No. 7,068,808) of the same title, which in turn claims priority from U.S. Provisional Patent Application No. 60/087,512 filed Jun. 10, 1998.

FIELD OF THE INVENTION

The method and apparatus of the present invention involve tool mark identification, which is a type of forensic analysis aimed at comparing images of marks made on an item with images of marks stored in a database to find any which appear similar enough that they could have been made by the same tool. The principal purpose is to find linkage between items associated with crimes, to assist in solving the crimes. The primary application is for analysis of ballistic items, which includes guns, bullets, and shell casings.

BACKGROUND OF THE INVENTION

Guns, including pistols, revolvers, semiautomatics, rifles, and shotguns are used in the commission of thousands of crimes per day throughout the country. There is growing interest in tracing the source and movement of guns. Often crimes are solved by being able to associate one crime with another, or a crime with a particular gun, or a gun with a particular person. Tools used during commission of a crime often leave characteristic marks at the crime scene, which marks can be useful in linking together various crimes, or in linking a crime to a weapon, or in linking a crime to a criminal. The evidence that allows such links to be developed involves particular tool marks, which each weapon makes on the bullets and shell casings fired from it.

Because the evidence must be protected against contamination and the chain of custody must be preserved, and since it is often desirable to compare markings obtained at one crime scene to those obtained at others, it has become common to create images of the markings and use computer systems for automated comparison of the images from newly obtained specimens with databases of previously obtained images. Only after a possible match has been determined are the physical specimens viewed side by side.

Ammunition for handguns, rifles and shotguns all contain an outer casing or shell, a primer device to ignite, a fast burning material which is a form of nitrocellulose, and a projectile to fly out the barrel. Ammunition that travels through a particular gun receives scratches from the barrel of the gun, indentation from the firing pin, and perhaps other marks from the breech face and ejector. These tool marks are characteristic of the particular weapon used, and may be used to link a bullet or casing with the weapon from which they were fired.

The shell casing receives marking from the firing pin hitting the primer, from the back pressure of the gas expansion forcing the casing against the breech face of the firing pin housing which may have marks or defects which transfer onto the primer and/or casing. These marks may be a result of manufacturing defects, or hand finishing done in high quality weapons. Breech face marks can be compared just as can firing pin marks, either by firing a test round or by examining the weapon when the weapon is available, or by comparing corresponding marks on two bullets or casings which are suspected of coming from the same weapon. If the same weapon is used to fire the same type ammunition at the same type target from the same distance, comparable patterns will be produced on the bullet and casing. If the ammunition is changed, the patterns will be somewhat different.

Tool marks can be also transferred to the casing by the extractor and ejector of semiautomatics and automatics. Such marks include indentations and striations. The ejector is likely to gouge the casing. The extractor pulls the casing from the breech, imposing perhaps additional striations and indents before it hits the ejector.

Class characteristic marks vary with caliber, load, material used for the bullet or shot, bullet weight, its impact behavior, material used for the casing, and identification stamped into the bullet and casing. Intentional marks on ammunition include information stamped on the face of the bullet casing during molding of the shells. Some casings and bullets also have an indented ring or rings around the circumference called a canellure. These are smeared with grease or wax as sealer, making the bullet water-resistant and providing some lubrication as it is forced through the barrel. The canellures on the casing are imprinted within a quarter inch from the top after the bullet is inserted. This crimp acts to seal the round and hold the bullet in the casing. Canellures may contain imprint information unique to the manufacturer and perhaps to a particular crimping tool.

Ammunition for handguns, rifles and shotguns all contain an outer casing or shell, a primer device to ignite, a fast burning material which is a form of nitrocellulose, and a projectile to fly out the barrel. Ammunition that travels through a particular gun receives scratches from the barrel of the gun, indentation from the firing pin, and perhaps other marks from the breech face and ejector, in addition to fingerprints. The hand of the person firing the weapon receives a spray of gun residue which may be characteristic of a particular type of weapon and ammunition. The target receives some degree of blowback from the weapon and the target itself, plus perhaps fragments of any materials through which the bullet passed.

Markings on ballistic items which are of interest to forensics include:

Fingerprints on the weapon, projectile, or casing.

Other debris and material on the weapon, projectile, or casing.

Characteristics on the projectile or casing associated with the particular brand and type of ammunition used.

Characteristics on the projectile or casing associated with the particular weapon used. These are called tool marks.

During manufacture, grooves are cut into the hard steel of pistol and rifle barrels, spiraling from the chamber to the muzzle. They cause the bullet to spin, which results in the bullet having a cleaner trajectory and the weapon having more accurate targeting. The raised areas between grooves are called lands. Bullets are intended to be fired in a particular caliber weapon. Nitrocellulose burns to produce an expanding gas, which drives the bullet through the barrel. The resulting heat causes the bullet to expand and softens its surface. Lead bullets are particularly prone to softening. The bullet is blown out of the shell casing and forced into the barrel, which is tighter. As a result, the lands are cut into the moving bullet and the surface is squeezed into the grooves. The high points of the barrel cause scratches in the bullet, which are referred to as striation evidence. The material used in the bullet determines the depth of the striations.

The number, width and depth of the grooves and the angle and direction (right or left) of their spiral are determined by the manufacturer. Lands and grooves together are called rifling. Rifling marks are transferred to the bullet as it is forced through the barrel. Some marks indicate the class of weapon used, while others indicate the particular gun or barrel used in the case of weapons with interchangeable barrels.

Most weapons other than Colt use a right twist. The number of lands or grooves typically is four to seven. The width varies depending on the number and the caliber. The degree of twist is measured by the distance traveled during one complete rotation of the bullet. A typical Colt handgun can be described as a left twist, six lands, $1/12$. Most handgun barrels are shorter than 12 inches. Therefore, the energy transferred to spinning the bullet is not as great as in a rifle.

When the ammunition used is smaller than that designed to be used in a weapon, the result is loss of energy and penetration. In addition, since the bullet is loose within the barrel, inconsistent striations will occur on various bullets fired through the weapon.

Maintenance done on a weapon can alter the characteristics imposed on its ammunition. Use, cleaning, corrosion, and intentional damage to a barrel can all affect the ability to match ammunition used in it over time. Rust or corrosion will alter fine details. Some semiautomatics and automatics have interchangeable barrels. After exiting the barrel, the bullet may receive additional distortions as it passes through various materials. The result may be to destroy the forensic value of the bullet, or may be just to require further analysis.

The shell casing receives marking from the firing pin hitting the primer, from the back pressure of the gas expansion slamming the casing against the breech face of the firing pin housing which may have marks or defects which transfer onto the primer and/or casing. These marks may be a result of manufacturing defects, or result from the hand finishing done in high quality weapons. Breech face marks can be compared just as can firing pin marks, either by firing a test round or by examining the weapon when the weapon is available, or by comparing corresponding marks on two bullets or casings which are suspected of coming from the same weapon. If the same weapon is used to fire the same type ammunition at the same type target from the same distance, comparable patterns will be produced on the bullet and casing. If the ammunition is changed, the patterns will be different.

Shell casings are ejected immediately from automatic and semis, and so fall close to where the firing occurs. Revolvers retain the casings until intentionally ejected, and so are often carried away from the crime scene. Tool marks can be transferred to the casing by the extractor and ejector of semis and automatics. Such marks include indentations and striations. The ejector is likely to gouge the casing. The extractor pulls the casing from the breech, imposing perhaps additional striations and indents before it hits the ejector.

Class characteristic marks vary with caliber, load, material used for the bullet or shot, bullet weight, its impact behavior, material used for the casing, and identification stamped into the bullet and casing. Intentional marks on ammunition include information stamped on the face of the bullet casing during molding of the shells. Some casings and bullets, particularly lead, also have an indented ring or multiple rings around the circumference called a canellure. These are smeared with grease or wax when first inserted into the casing. The material acts as sealer, making the bullet water-resistant and providing some lubrication as it is forced through the barrel. The canellures on the casing are imprinted within a quarter inch from the top after the bullet is inserted. This crimp acts to further seal the round and hold the bullet in the casing. Canellures may contain imprint information unique to the manufacturer and perhaps even to a particular crimping tool.

Types of ammunition are distinguished by their size. All handguns are designated by caliber in either inches or millimeters. For example a .22 caliber is $22/100$ inch. The length of the shell varies to increase the capacity of gunpowder. A .22 may be short, long or long rifle, plus a magnum load. All magnum loads contain more gunpowder and may propel a heavier bullet. Magnum weapons are always designed to be heavier to contain the increased force. A magnum weapon can chamber a regular load, but a regular weapon cannot chamber a magnum round.

Some .22 handguns and rifles can chamber only the short, some can chamber short and long, and others can handle all three. The .22 short and long have the same weight bullet, while the long has more powder. The long rifle has more powder still and a heavier bullet but still is not considered a magnum load. All .22 rounds of these types are rim fire primers, rather than center core primers. Some high-powered rifles can proper .22 caliber bullets with center core primers, but the shell casings are huge relative to this group.

The .25 caliber pistol purse gun is designed to be easily concealed. There are .32 caliber revolvers and semiautomatics. The .32 caliber rim fire primers were used in early revolvers, but all modern rounds are center core primers.

There are two types of ammunition for .38 caliber (.357) revolvers; the .38 S&W and the .38 Special. The .38 Smith and Wesson is a shorter shell with smaller load. It has been superceded by the more powerful .38 Special, designed for law enforcement use. The maximum stopping power for the .38 caliber became available when the .357 magnum was marketed. The weapon fires a heavier bullet, with longer casing that contains additional gunpowder. However, when firing a solid lead bullet, the weapon proved a hazard to unintended secondary targets, because the penetrating power was too great.

For police use, a combination of stopping power and safety are desired. Several .38 caliber bullets are designed to impact only the first target, transferring all the kinetic energy to it. Hollow point bullets were designed for this purpose. A hollow point is a soft lead bullet encased in a thin steel jacket. The point is actually an opening with thin lead walls. On impact the wall flare out. The final shape of the bullet, in the side view is similar to a mushroom. Hence the term "mushrooming" is applied. Hollow points don't necessarily mushroom every time, and can still harm secondary targets, such as by passing through soft tissue of the target and injuring someone behind.

Glasser bullets were developed with a prefragmented round constructed of a thin metal skin packed with very small lead particles suspended in liquid Teflon. The bullet's weight is equal to that of a solid lead bullet, resulting in equivalent kinetic energy. When the Glasser hits any resisting surface, the thin walls flatten out, distributing the tiny lead particles over a wide area. A bullet hitting a human or animal penetrates and opens up, transferring all its energy to the inside of the target, having an elephant gun effect. The Glasser offered improved safety since all energy was expended when the bullet hit something. Errant shots striking pavement would not ricochet. Bullets hitting a house would not penetrate walls. Other manufacturers also offer prefragmented bullets.

Shotgun shells are different from handgun and rifle ammunition. Although solid metal casings have been used, they are now mostly replaced by a combination casing with a metal face and base connected to a plastic or waxed cardboard cylinder. Shotgun shells are available in gauges 10, 12, 14, 16, 20, and 410. The cylinder is crimped shut, sealing in the projectiles, shot and other materials with the gunpowder. The face contains manufacturer's information and markings and houses a center core primer. The actual projectiles vary. The shot, which was traditionally lead, is gradually being replaced by steel balls. Lead shot has been cited by environmentalists as causing lead contamination in waterways.

Current Technology for Tool Mark Identification

Firearms examiners can study the shell casings collected at one crime scene and determine the number of different weapons involved. They can compare the casing to those from other sources. They can also compare bullets to determine the possibility they came from the same weapon, and they can analyze weapons for characteristics which might match bullets and casing fired from it. Current examinations of firearms, bullets and casings use low-powered stereo binocular microscopes combined with high-energy illumination. The systems incorporate computers to assist in finding likely matches between a new casing or bullet and databases of ones previously collected, selecting potential matching items. Although somewhat automated, current techniques are still labor intensive, acting only to select likely matching items for manual review by a ballistics expert. The Federal Bureau of Investigation (FBI) and the Bureau of Alchohol Tobacco and Firearms (ATF) have each established a network of computerized systems to support the identification of guns, bullets, and casings; allowing member labs to share databases.

The Drug Fire program started by the FBI in the 1990's has established a network of computers in more than 40 forensic labs that exchange breech face striation information. Each member agency is responsible for classifying all its cases, and placing the information in computer. Any member agency can then compare evidence from its case to all other cases in the system. A second system, Bulletproof developed for the ATF, records striations on the bullet while the casings are categorized by a system called Brass Catcher. The national scope of these two programs is intended to assist in investigations of drug-related gangs with national networks.

Baldur (U.S. Pat. No. 5,390,108) presents a computer-automated bullet analysis apparatus. A microscope obtains and amplifies optical signals representative of the characteristics of the surfaces, and the optical signals are converted first to electrical signals and then to coded digital representations. The coded representations are stored in memory and are matched against one another to see if there is a match between the bullets. The ATF system is based upon that apparatus.

Land marks of 45 caliber bullets are normally photographed at 10× magnification and then enlarged to 4×, with at total enlarged ratio of 40×. 22 caliber long rifle bullets are commonly photographed at 20×, resulting in a total enlarged ratio of 80×. The reproducibility of land marks is better than for groove marks, especially for jacketed bullets. The width of groove marks is very wide compared to land marks in some cases; such as with 45 caliber bullets fired from an M1911A1 semi-automatic pistol. Imaging multiple groove marks at one time is difficult due to the need to focus at different depths.

Examiners compare the contour of the bullet surfaces using a comparison microscope. Not all of the bore surface characteristics will be reproducibly transferred even on consecutively fired bullets. In addition, there are always extraneous markings, which are not due to the gun bore surface, which an examiner must ignore.

Achieving proper illumination for detailed imaging is difficult with current matching systems. The metallic nature of the items causes glare and reflection to interfere with good imaging. Use of glancing light to highlight the relief structure interferes with distinguishing lands and grooves. Shadows create or mask features, and the depth of striations and indents cannot be determined. The automated analysis engines are computationally intensive and may be confused by manufacturing marks, shadow, glint, and focus. They may not distinguish between individual characteristics peculiar to the weapon, and manufacturing marks or incidental marks of no significance. The imagery and therefore the analysis is prone to variations due to differences in initial alignment, and to inconsistent lighting strength and direction from day to day and from lab to lab and technician to technician.

Current matching systems do not have the desired accuracy, speed, cost effectiveness, and ease of use. Due to the 3-D nature of the ballistic items, achieving proper illumination for detailed imaging is very difficult. The metallic nature of most of the items causes glare and reflection to interfere with good imaging. Use of glancing light to highlight the relief structure interferes with determining which marks are lands and which are grooves. Shadows create or mask features, and the depth of striations cannot be determined. Details of the firing pin indentation cannot be seen without causing significant glare and shadow.

Current systems are not optimized for networking among many different users each having their own imaging system and sharing databases. Image orientation, focus, histogram, and size are not standardized. Current apparatus allows for variations in settings of focus, brightness, orientation, and size of the image according to the judgment of the user. The automated analysis engine is computationally intensive. It is confused by manufacturing marks, shadow, glint, and focus. It cannot distinguish between individual characteristics peculiar to the weapon, and manufacturing marks or incidental marks of no significance.

The imagery and therefore the analysis is prone to confusion due to inconsistent and aging lighting strength and direction from day to day and from lab to lab. Since there are no registration indices on the fired bullets or casings themselves, the matcher must try a range of rotations and translations for each potential match. Adopted rules, such as aligning the firing pin blow out to 3:00 (three o'clock) are of some assistance in manual placing of casings into the microscope holder. However, that feature is not always present in casings, and when it is, that procedure still allows for variations in rotational position of 5° or more. Manually aligning striations to the 9:00-3:00 horizontal is also prone to individual rotational variations on the order of 5°.

The current Drug Fire system does not automatically extract and match features by their degree of significance, although it provides some manually assisted techniques for highlighting regions of interest. The current systems are designed to be a filter against the database, locating likely matching items in the database and presenting pages of 25 images at a time on a large screen monitor for a ballistics examiner to review and interactively compare. His comparison involves manually aligning two images on a split screen and looking for matching lines. Such matches may not be obvious without extensive manipulation of contrast, brightness, rotation, and translation of the two images.

A significant limitation to the automatic determination of matching images in a large database is the problem of distinguishing lands and grooves due to variations in the strength and directionality of the illumination. Striations may also run together, confusing the count. Other illumination-induced artifacts may also be created, particularly in the primer area about the firing pin indentation. Imprecise measurement of firing pin position and lack of detail on the shape of the indent, end points and width of striations, and other specific feature characteristics also result from illumination variations. As a result, visual images do not currently provide the capability for large database partitioning and searches based upon extraction and characterization of features.

The need is for a ballistics matching technology which is faster and cheaper than current techniques, which finds more correct matches with less manual intervention by a ballistics examiner, and which can exploit the current databases and enhance the performance of existing ballistics identification systems. The goal is to increase the capacity of the law enforcement community to identify increasing numbers of ballistic items, faster and with greater accuracy, and at minimum cost both in terms of manpower and system expenses.

The situation is analogous to that of fingerprint matching. As increasingly large databases are created, techniques are needed to partition those databases and to perform matches based upon feature characteristics, with full image comparison being performed on only a small percentage of the database considered candidate matches. Due to the nature of ballistic items and the distortions to which they are subjected, and to variations in illumination resulting from aging, positioning, focus, personnel, and laboratory differences, visual imaging does not provide sufficient consistency and reproducibility of feature location and characteristics to facilitate such precise matching.

Toolmarks by their nature are three dimensional local deformations to the surfaces of marked items. Using contact sensors to accurately record finely detailed toolmarks necessarily becomes slower as the characterizing detail is smaller and requires a smaller probe and finer sampling grid for accurate recording. The contact sensor's angle of approach to a detail can affect its recorded depth, which may require that multiple contact measurements be combined to generate each reference measurement for a given toolmark. Recording using noncontact sensors requires the toolmark deformations to be apparent in spite of topographic or textural variations in surrounding surface areas that could hide, distort, or shadow toolmark features depending on the aspect angle of the sensor and that of illumination or activation sources intended to increase sensor detection of the toolmark. Contact or noncontact sensors that may modify the toolmark should not be used in applications requiring repeated re-identifications or evidentiary use in forensic cases.

Prior approaches to automation of toolmark identification have primarily used noncontact techniques such as laser scanning or visible light imaging with spectral band and optics selected for the substrate material and the size of identifying toolmark features. Inherent differences generally exist between the appearance of recorded images and actual surface geometry of toolmarks due to several variables including: sensor wavelength, width and depth of mark, color, refractive index, extinction coefficient, speckle, fringes, aspect angle, sensor vibration, multiple reflection, and lighting conditions that cause shadowing effects or glare. Particularly for microfeatures, accurately identifying matching toolmark features on two items' surfaces requires precise replication of toolmark position, orientation, illumination or activation, and sensor parameters for each recording. To the extent replication of the set-up for imaging cannot be automated, manual intervention is required. Introduction of subjective human adjustments necessarily adds both random and systematic variability to recorded toolmark images, affecting the decision of whether or not two images represent matching toolmarks. Automating that decision requires consideration of manually-introduced variations.

DEFINITIONS

Gun—device with barrel which fires a projectile, including pistols, revolvers, semiautomatics, rifles, and shotguns.

Bore—diameter and inside surface of a gun; it may be smooth or grooved

Riflings—spiraled, grooved markings inside a barrel

Trigger—mechanism used to fire the gun by releasing the hammer which strikes a firing pin housed inside the breech block Firing Pin—mechanism driven into the primer area of a cartridge to initiate firing the projectile Primer—firing pin strike can be center fire or rim fire Cartridge—case containing the projectile or bullet; it may be reloaded for repeated use Forensic Item—any item used as a weapon, or item associated with a crime which may display marks related to the crime, including marks made on a human body Ballistic Item—gun, bullet, shell casing, or other weapon, projectile, or element including the hands which may cause or receive marks or residue associated with firing a weapon Infrared camera—an imaging device whose detectors are sensitive in a spectral band between 1 and 14 micron; the infrared camera may have an associated spectral filter which blocks or transmits segments of its band.

Active infrared imaging—heating or cooling the subject of the infrared image, including by sunlight, hot or cold air, immersion in fluids, application of flame or ice, or other means.

Image sequence—one or more images of a forensic item in which the camera is focused on specific features of the item Reduced image sequence—an image sequence formed by selection of images which are of keenest interest to a ballistics examiner Features—extended marks on a forensic item visible in visual or infrared imagery caused during the manufacturing process or during use. They include pits, scratches, embossing, gouges, residue, and machining flaws Extracted feature sequence—a processed image sequence or reduced image sequence in which only features are shown Image sequence focus montage—also referred to as a montage—combined sharp focus portions of multiple images in a sequence to make one or more composite images Class characteristics—features related to a particular type of weapon or ammunition and include: caliber of weapon, type of ammunition, type of casing, number of lands and grooves and twist angle.

Tool Marks—residual markings left on an item which has been manufactured or worked using a tool. In the case of a ballistic item, it can be left by the manufacturing process, by incidental use, or by use as a weapon.

Weapon characteristics—features related to a particular weapon and may include firing pin impression, breech face marks, ejector gouge, extractor mark, striations, land and groove locations Residue—materials deposited on a ballistic item, including blood, oil, gun powder, dirt, grease, fingerprints, body tissue, and building materials.

Manufacturers Mark—embossed or indented markings made during the manufacturing process, on cartridges this would commonly include type and caliber of ammunition such as "30-30 WIN"

Orientation—position of the ballistic item relative to the axes of the camera

Siblings—two bullets, bullet fragments, or shell casings known to have been shot from the same weapon with the same barrel.

SUMMARY OF THE INVENTION

The present invention relates to a method and apparatus for comparing patterns of marks found on ballistic items (including guns, bullets and shell casings) to determine whether they have common characteristics which would indicate that the bullet or casing has been fired from a particular weapon. The invention provides the ability to rapidly match images of an unknown ballistic item with a database of images of ballistic items including guns or ammunition fired from known weapons or unknown weapons, providing linkage between weapons or crimes or other events from which the guns, bullets or casings were recovered.

An aspect of the invention is a computer implemented method for automating toolmark identification. A toolmark is positioned relative to one or more imaging sensors, the positioning being sufficiently precise to enable the imaging sensors to produce a sequence of image frames from which replicable three dimensional (3D) surface models of the toolmark can be generated. The focus distance and orientation of the imaging sensors is varied systematically, producing the sequence of image frames, the imaging sensors using a fixed focus optics having shallow depth of focus. 3D surface models of the toolmark are generated from the sequence of image frames, and then compared with a database of known toolmarks similarly modeled to identify a matching toolmark.

In further aspects of the invention the precise positioning is implemented using a computer numerically controlled device, which may be a numerically controlled lathe in which an emissivity sensor replaces the cutting head. Extended focus two dimensional (2D) images are also generated from the sequence of image frames. Optionally, the toolmarked item may be barcoded to facilitate automatic batch processing during the identification process.

DESCRIPTION OF THE DRAWINGS

Many details and advantages of the present invention will be apparent to those skilled in the art when this document is read in conjunction with the attached drawings where matching reference numbers are applied to matching items and where.

(1) image capture and .display, including the ballistic examiner's display, feature highlighter, and interactive devices.

(2) feature extraction and characterization.

(3) database matching and updating.

Figure 14:
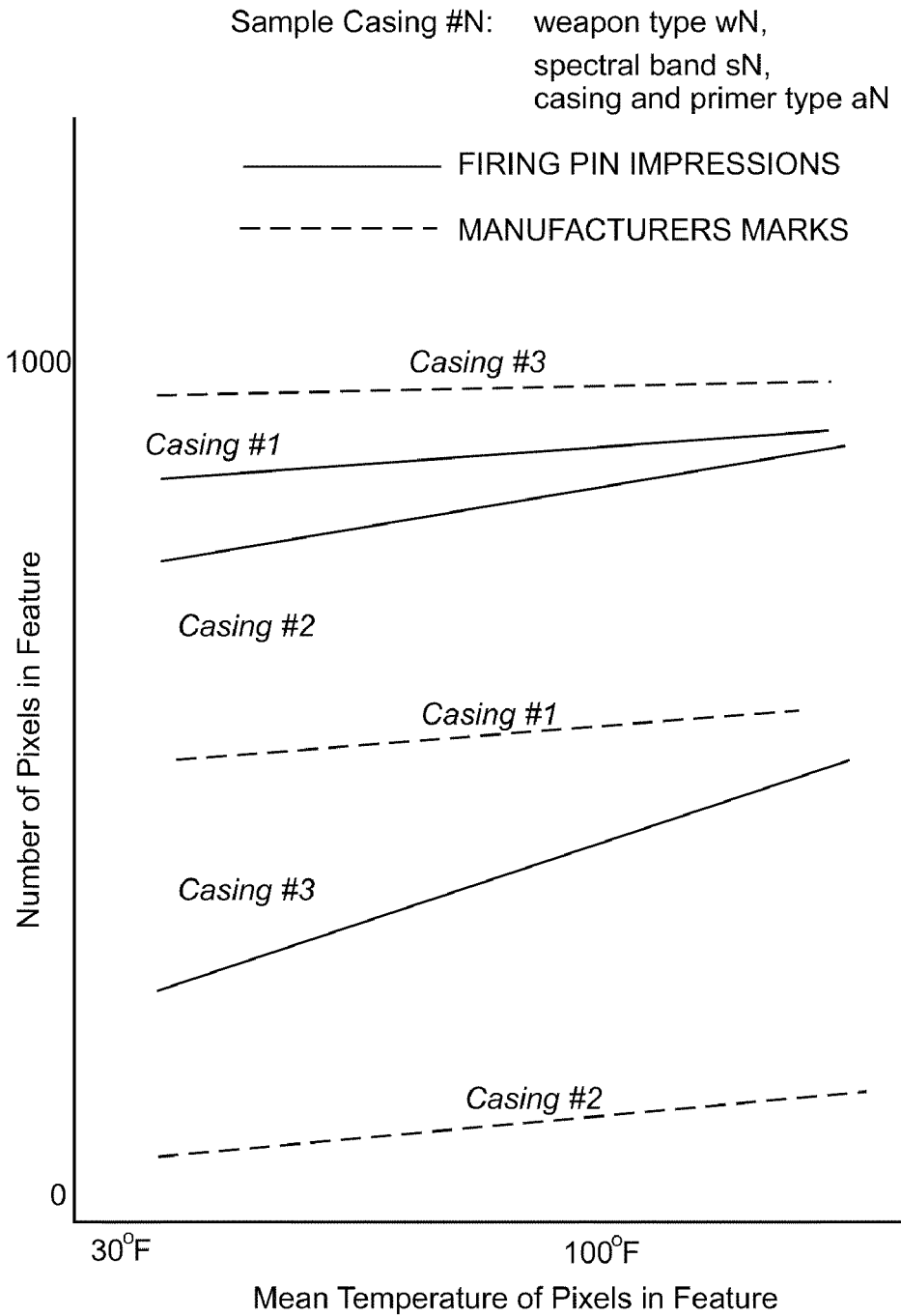

FIG. 14 presents a hypothetical graph of the apparent size of a feature as a function of gray scale values (or temperatures) included in the feature, using different spectral bands. Such graphs can be used to automatically determine the material of the item including principal and trace components, the type of weapon, and the manufacturer.

DETAILED DESCRIPTION OF THE INVENTION

Introduction to the Invention

Infrared imaging of guns, fired bullets and spent casings can provide detailed definition of characteristic features free from the shadowing, glint, and focus blur associated with visible light imaging. Although IR imaging is normally associated with measurements of temperature, the imagery from an IR camera results from emissivity and geometry variations in addition to thermal changes. The tool marks which are of forensic interest on bullets and casings are associated with significant emissivity differences. In particular, deep grooves such as firing pin indentations and primer edges create highly detailed observable features in IR imagery even at ambient temperature. Use of IR imaging for ballistics identification is therefore not intended to measure temperature differences, but rather to display and analyze emissivity and geometric differences associated with indentations and embossed features of the ballistic item.

The features seen in the infrared images do not vary in position or extent as a function of illumination as do visible images. Therefore they provide stable references for alignment with other images for comparison purposes. Additional details can be obtained by active IR imaging, in which the temperature of the gun, projectile or casing is varied. This provides a sequence of images in which certain features of interest are particularly apparent at specific temperatures. This process is suggested only when it is necessary to enhance very faint features.

Summary of Benefits of IR Ballistics Identification

Infrared Imaging in Ballistics Identification

The class characteristics of the ammunition and weapon include: caliber of ammunition, type of weapon, number of land marks, direction of twist of land marks, land mark width, angle of twist of land mark. All of this information can be obtained from infrared images, given that sufficient images at the correct temperature ranges are available.

The individual characteristics of the ammunition and weapon include the particular surface condition and shape of the bore, the particular striations imposed on the bullet, and the particular markings imposed on the casing. These characteristics can also be determined using infrared images. Even when caseless Teflon bullets are used, active infrared imaging may exploit minute markings transferred to the bullet by the barrel and firing charge. A rotating IR probe, similar to endoscopic cameras in medical use, can produce a detailed image of a gun barrel, which can then be matched against casings and bullets which are suspected of having been fired from that gun. In some instances, this may be preferable to making test firings from the weapon; particularly if the weapon is considered unsafe, or if it is necessary to preserve the weapon in its present condition as to residue etc.

The weapon itself should display identifying information such as the manufacturer's name and logo and serial number. If the serial number has been removed, use of infrared imaging can assist in recovering the information, since the emissivity of the area will be affected by attempts to file off or chemically etch off the serial number. By heating and cooling the weapon, a number of corresponding but different images can be obtained and all used to assist the reconstruction effort.

Characteristic weapons-identifying markings to be imaged and compared, include:

Scratches made on the bullet by the lands and grooves
Scratches made on the shell casing by the extractor and ejector of semiautomatic weapons
Indentation on the casing made by firing pin and breech face.
Indications of refilling and reusing the casing
Lands and grooves within the gun barrel
Trace items in residue deposited on the shooter's hand, within the gun, on the victim, on the bullet and casing, and on other targets.

Heat conduction analyses can be performed by heating the ballistic item and imaging it while it cools. Estimates of the depth and volume of indentations, striations, and gouges can be made based on their cooling rates. The material composition of each area of the item must be considered.

Evaluation of Ballistic Matching Systems

Current systems, such as Drug Fire, compare an unknown ballistic item's image to all corresponding images in a database, producing a correlation value for each. Database images are then re-ordered based upon that correlation value, with the highest correlation ranked first. In controlled testing where the identities of all siblings are known, a measure of the accuracy and efficiency of the matching engine is the position of siblings in the re-ordering. The results shown below in the left column are taken from the Drug Fire system manufactured by Mnemonics Systems Inc. The right column shows the use of a different matching engine (FlashCorrelation® patented by the inventor) with the same visual image database as used by Mnemonics. 1157 shell casings from 229 weapons were used for the tests. The images were all taken with a conventional videomicroscope camera. MIKOS did not have the opportunity to collect its own images of the casings. Therefore, no infrared images were obtained or used for this comparison test. The purpose of this table is merely to show how ballistic matching systems are evaluated. In a smaller test, the use of infrared imagery produced significant additional improvement in position of siblings over the use of visual imagery, with nearly all siblings clustered at the very top of the ranking "P" is a ranking order from 2% to 100%. Each image in the database is compared against every other, and the database is reordered by the degree of similarity with the target image. Each sibling of the target image (images of other casings fired from the same weapon) is located on the reordered list and included in the corresponding P value. Ideally all siblings would occur at the top of the rankings. The process is performed for each image in the test set database in order to obtain a statistical assessment of overall system performance.

Best indication of the relative performance of two systems would be to compare their results at P=2% since as P gets larger towards 100% any matching technique would produce similar results. In particular, at P=100% all matching techniques achieve 100% inclusion. Mnemonics did not report rankings for P less than 10%. If we extrapolate the Mnemonics results to 2%, the expected value was 25%. Comparing that with the 46% MIKOS value indicates that the MIKOS matching engine achieved 80% more detections at 2% than did Mnemonics.

The intent of the ballistics matching system is to find the best matches in the database and display them to a ballistics examiner who makes the final determination as to whether a match exists. The goal is to minimize the work of the examiner without sacrificing accuracy. The growing size of current databases requires a higher degree of automation to find links between crimes and suspects before either the statutes of limitations or the suspects expire.

IR Imaging Provides Consistent Feature Extraction and Characterization

Infrared imaging of guns, fired bullets and spent casings can provide consistent and detailed definition of characteristic features free from the shadowing, glint, and focus blur associated with visible light imaging. Well-defined infrared imagery from casings and bullets is obtained even with the item at ambient temperature. The apparent temperature differences seen are due to variations in materials, and emissivity differences associated with geometry factors, and depth of markings. Therefore, the firing pin indentation, its surrounding area, the primer area, and the outer ring will all appear to be at different temperatures, although all are at room ambient. Use of the thermal imaging IR camera is therefore not intended to measure temperature differences, but rather to extract features based upon emissivity and materials differences. The resulting features can be automatically characterized, classified, and then matched against portions of the database having similarly characterized features. Since the features do not vary in position or extent due to imaging conditions, alignment of candidate matches is facilitated by Active Infrared Imagery Enhances the Features but is Optional Active IR imaging, in which the temperature of the gun, projectile or casing is varied, provides a collection of images at the various temperatures. Certain features of interest are particularly apparent at specific temperatures. Features associated with different materials such as the primer, or with emissivity differences such as caused by abrasion, are more well defined when viewed with an IR camera. For a given type of gun or ammunition a set of temperatures can be determined such that the sequence of images resulting from heating or cooling the gun, projectile or casing to those temperatures provides an optimized data set for matching against a database. Matching can be done using standard image processing techniques such as optical or digital correlation, or using proprietary techniques such as Flash Correlation (U.S. Pat. No. 5,583,950 Method and Apparatus for N-dimensional Image Identification and Analysis.

If the ballistic item is heated and then imaged as it cools, the technique provides a sequence of images at various temperatures for each item. At certain temperatures, depending upon the composition material of the item, specific markings are enhanced. For example: serial numbers on a gun, manufacturers markings on a shell casing, striations on a bullet caused by the gun barrel, fingerprints, firing pin indentation and breech face marks on a shell casing can be characterized by size, shape, and relative location in a sequence of infrared images, as a function of imposed temperature. A feature template can be produced for each image in each sequence, by thresholding hot and cold values or other standard feature extraction techniques commonly used in image processing.

Feature Extraction and Characterization Provides Database Partitioning

Any extended area of the infrared image with apparent temperature differences from the surrounding area may be considered a feature. Using the sequence of images or extracted feature templates, significant features can be extracted and characterized prior to use of the matching engine. Characteristics of the infrared features such as area, dimensions, depth, focus setting, variation in depth and apparent temperature, shape, inclusion of subfeatures, apparent temperature, location relative to center and edges of the ballistic item, ratio of perimeter to area, distance and vector to other features, persistence or exclusion over a range of imposed temperatures, persistence or exclusion under specific spectral filters may be computed and used to characterize the set of features seen in an image sequence or montage. If visual images are also being processed, then the visual characteristics of features seen in the infrared may also be used to characterize the features for a particular ballistic item.

By storing feature characteristics in a relational database, possible matches can be more quickly located. In general it is not necessary to find all matching ballistic items, such as all sibling casings. A single positive match provides links to others already in the database. As an example, for an unknown casing, determine the characteristics of: (1) distance from firing pin indentation to the center of the casing, (2) depth of indent, (3) angle of breech face marks relative to the line from firing pin indent to center, and (4) existence of ejector gouge. Then locate other items in the database which have some or all of the same characteristics. This is referred to as partitioning the database into candidate matches and other items. Candidate matches are then subjected to further processing. The corresponding image sequences or montages can be compared and those not sufficiently similar excluded from the candidates list. Remaining candidates are then presented for review by a ballistics examiner.

Selection of features to be characterized, and the characterization process, can be fully automated or manually assisted. Partitioning significantly reduces the search time required to look for matches, but requires knowledge about the variations which may occur in firings of a particular weapon. For example, changing the ammunition size or type used will change the markings imposed by the weapon. Therefore, in conducting a search against a database, to reduce the occurrence of false negative results, the criteria for including a database item as a candidate matching item must be considered relative to possible variations such as: whether the weapon has interchangeable barrels, whether it might be used with different sized ammunition, whether it might have been cleaned, whether it might have had heavy use between the database entry and the current characterization.

The precise extraction and matching of feature characteristics which is the method of the invention cannot be effectively performed on visual images due to the nature of the ballistic items, which produce illumination artifacts such as shadows and glint, and cause confusion of lands and grooves, and obliteration of fine details in deep markings such as firing pin indentations.

Class characteristics of ammunition and weapons include: calibre of ammunition, type of weapon, number of lands, direction of twist of land marks, land mark width, angle of twist of land mark. All of this information can be obtained from infrared images.

Individual characteristics of the ammunition and weapon include: the particular surface condition and shape of the bore, the particular striations imposed on the bullet, and the particular markings imposed on the casing. These characteristics can also be determined using infrared images. Even when caseless Teflon bullets are used, active infrared imaging may exploit minute markings transferred to the bullet by the barrel and firing charge. A rotating IR probe, similar to endoscopic cameras in medical use, can produce a detailed image of a gun barrel, which can then be matched against casings and bullets which are suspected of having been fired from that gun. In some instances, this may be preferable to making test firings from the weapon; particularly if the weapon is considered unsafe, or if it is necessary to preserve the weapon in its present condition as to residue etc.

The weapon itself should display identifying information such as the manufacturer's name and logo and serial number. If the serial number has been removed, use of infrared imaging can assist in recovering the information, since the emissivity of the area will be affected by attempts to file off or chemically etch off the serial number. By heating and cooling the weapon, a number of corresponding but different images can be obtained and all used to assist the reconstruction effort.

Examples of Characterization of Features

In matching casing faces, the database can be characterized according to:

Distance off center of firing pin indent.
Depth of firing pin indent.
Percent of face area having breech marks.
Depth of breech marks.
Angle between breech marks and firing pin vector, which connects the deepest indentation point with the closest spot on the casing edge.
Position of ejector marks relative to firing pin and breech face marks.
Images in the database can be oriented such that the flareout of the primer is pointing to 3:00 (three o'clock) if it is not symmetrical; if it is symmetrical, then the firing pin indentation vector is set to be pointing to 3:00 if it is off-center; if it is also centered, then the breech marks are set parallel to the horizontal (3:00-9:00).

For bullets, the database can be characterized according to:
Calibre of bullet
Material
Length
Number of twists
Length of striations of maximum depth
Number of striations vs. Length
Relative positions of end points of striations.

For casing sides the database can be characterized according to:
Calibre of bullet
Material
Presence of ejector mark.
Presence of extractor mark.
Number of striations vs. Length Images in the casing sides and bullet databases should be formed as composites of the multiple frames taken as the bullet or casing is rotated. The composite images can be oriented so as to align striations with the horizontal plane of the image. Due to spiraling of the lands and grooves, image segments must be composed to create an image of the resulting striation pattern from the various segments imaged.

For images derived from thermal probes of gun barrels, the database can be characterized according to:
Calibre weapon
Twisted bore or not.
Number of lands and grooves
Angle of twist.
Relative positions of start and stop points of lands and grooves.

The resulting strip image should be formed into a 2-dimensional image as if the gun barrel were sliced open and laid flat, and should be oriented such that the lands and grooves are horizontal in the image.

Detection of Illumination-Induced Artifacts in Visual Images

Since existing databases of ballistic images are all taken in the visible spectrum, utilizing those databases requires that new images also be taken in the visible domain. Due to the superior advantages of infrared imaging, it is anticipated that at some time in the future IR ballistic imaging will become standard. Meanwhile, IR images can begin to be collected for current and future use, and also to aid in exploitation of the existing databases.

By imaging in both IR and visible bands, extracting and characterizing features in each band, and comparing the results, apparent visible features which are in fact illumination-induced artifacts can be eliminated from the characterization of a ballistic item prior to matching against the database. Any true visual feature will also appear in the IR image. Eliminating artifacts will reduce the false positive error rate in visual matching.

True visible features such as striations may suffer from apparent reversal of deep and tall (e.g. land and groove) markings due to the angle of illumination. The comparable IR feature can be used as a reference to locally vary the gray-scale allocation (look-up table or LUT) in the visible image to best match that of the IR image. The result will standardize the appearance of the striations in the visible image, and improve the accuracy of the matching system.

Separation of Manufacturers Marks from Weapons Marks

Certain markings imposed by a manufacturer, such as the calibre and manufacturer's identity on shell casings, have a characteristic depth or height which facilitates separation of those markings based upon their apparent temperature difference in infrared images. The distinction between those features and others may be further enhanced by heating or cooling the ballistic item. A template may be made from the infrared sequence which can be used to separate the manufacturers and weapons marks in the corresponding visible images. This processing step allows for separate consideration of the two sources of marks, with the realization that the two types of marks may overlap and so subtracting one type may create changes in the feature characteristics of the other which must be accommodated in the matching engine.

Infrared Images to Identify Residue in Visual or Infrared Image Matching

Infrared imaging can employ optical filters to assist in determining the presence and composition of gunshot residue, as well as blood, body tissue, building materials and other matter deposited on bullets during their trajectory. Nitrocellulose forms carbon and the oxides of nitrate and nitrite. Other components may contain barium, antimony, cooper, and lead oxides or salts. Center core primers, found in most ammunition, traditionally have contained all four chemicals, but lead is now less prevalent, and rim fire primers, used almost exclusively for .22 calibre, often have no barium or antimony.

By the use of filters, the presence of residue on the ballistic item can be determined and classified. Apparent features of the ballistic item which are actually residue can be ignored for purposes of automatic matching against a database. This is particularly useful in the case where residue produces an apparent feature or obliterates existing features. If residue is detected, the system can provide instructions to the system user that the particular ballistic item needs to be cleaned prior to further imaging.

Infrared imaging of the hands of suspects can also utilize spectral filters to search for gunshot residue. This provides a possible immediate testing capability when a firearms investigator is not available, or the scene is too contaminated to facilitate clean lifting of debris from the suspect for later analysis. By combining infrared imaging of the hands and face of the suspect, the issue of chain of custody of the hands samples is eliminated, since infrared images of each person's face is unique. If the infrared camera annotates date and time, it minimizes the level of training and time required at the crime scene. Lift samples can be taken and studied via chemical analysis using a scanning electron microscope, as is traditionally done, in addition to the infrared analysis. For this application, an IR camera with automatic sequencing of optical filters and video or digital output recording provides the best setup for archival purposes and to support future analysis.

Application of Infrared Imaging to Advanced Weaponry

For the future, increasingly sensitive imaging and matching techniques are required: Teflon-coated bullets do not pick up land and groove impressions well. Caseless bullets have been developed which leave no shell casings after firing. The weapon used is an electronic .223 calibre rifle, called Lightening Fire, made by Jaguar Sport. The shell exists but is constructed of propellant only. When the trigger is pulled, an electric charge, not a firing pin, detonates the propellant, burning the entire casing. The combination of the self-destroying shell case and Teflon bullet will provide very little evidence for evaluation. Active infrared imaging of such bullets may provide sufficient information for identification and matching.

Image Montage Creation

A composite image or images can be created by combining the best focused local image of each true feature of a ballistic item to create an image of the entire item in which each feature is in its relative position and in focus. The montaged images can be displayed to the ballistics examiner and/or first used in automated correlation processing to determine candidate matching items. This step can be performed for either visible or infrared image sequences and matching procedures.

Automated Toolmark Identification

The Automated Toolmark Identification System (ATIS) described herein is designed to fully automate toolmark recording and identification. It performs computer-controlled emissivity mapping of a toolmarked item by the steps of: positioning the toolmark relative to the emissivity sensor, controlling sensor operation, recording sensor output, applying an identifying filename to data records that can be uniquely associated with the specific toolmark, and facilitating removal and insertion of toolmarked items. The system utilizes CNC (computer numerically controlled) positioning of the toolmark relative to the emissivity sensor in order to eliminate subjective manual adjustments to focus, position, and orientation, thereby providing more reliable collection of emissivity data in less time. Synchronized recording of a sequence of emissivity maps and change in sensor-toolmark distance provides two-dimensional slices from which a three-dimensional surface model and extended focus 2D representation can be constructed.

Infrared cameras record spectral emissivity as a component of apparent temperature. Infrared images present the apparent temperature corresponding to each image element. Calculating the actual temperatures requires knowledge or measurement of the emissivity of each target element, which is a significant challenge in some applications because emissivity depends on many variables including wavelength, material composition, surface texture, and temperature. The strong influence of emissivity in apparent temperature images is considered a serious limitation of infrared imaging in applications requiring true temperature mapping. However, it is key to extracting surface structure from infrared images in ATIS.

Compared to visible light cameras, infrared cameras have narrow depth of focus which is considered a serious limitation for some applications and is compounded by the use of microscope lenses for fine details. However, ATIS takes advantage of the focus limitation by range gating to estimate depth of a toolmark element by referencing the CNC position at which that element is in sharpest focus. The required resolution in depth measurement determines the maximum incremental step in CNC positioning along that axis and the selected optic. The spectral sensitivity of the infrared camera and optional spectral filters is specified by considering the material composition, temperature, and size of toolmark elements to be identified.

DESCRIPTION OF THE APPARATUS

The apparatus consists of the following components:

1. Infrared imaging microscope having radiometric calibration for each image frame output, such that a given gray level corresponds to a particular apparent temperature. Variable focus optics allow for detailed in-focus imaging over the full range of depth and height of the ballistic item features.

2. Shroud to avoid ambient light striking the ballistic item to cause reflections or heating.

3. Holders for shell casings such that the back end is viewed normal to the camera axis.

4. Holders for shell casings such that the side is normal to the camera axis and the casing can be rotated for a full 360° image.

5. Holder for essentially undeformed bullets such that the bullet can be rotated and all of the surface can be imaged normal to the camera axis.

6. Holders for deformed bullets such that multiple images can be taken which will encompass the entire surface area. Assume the bullet may have no obvious axis or center; the need is to completely image the surface. Multiple positionings may be needed.

7. Holder for gun which facilitates operation of an infrared probe which has a helical scanning rotating head and forms an infrared image of the inside of the barrel of a gun as it cools.

8. (Optional) Heater subsystem which can be on-line: radiant heat lamps, hot air, direct contact electric heat; or off-line: boiling in water or other liquid, heating in a controlled oven.

9. (Optional) Spectral filters, which can be used to obtain additional image information such as the composition of the ballistic item, including material of the casing, material of the bullet, type of primer. Alternately, the system user can determine these characteristics.

10. Feature Extraction Engine, which can be image processing software, firmware or hardware to locate local areas of interest in the image.

11. Feature Characterizing Engine, which can be image processing software, firmware, or hardware to perform measurements of the features and associate those measurements with the image in a database.

12. Focus position indicator, which annotates each image in a sequence with the focus position at which it was imaged.

13. Image montage generator, which determines the best-focused image of each feature, and generates a composite image or images in which all features are present and each is in focus.

14. Matching engine which correlates a montaged image of an unknown ballistic item against images in a database and rank orders or thresholds the results to produce a list of candidate matching items.

15. Examiner workstation 100 which interacts with the ballistics examiner and displays the candidate matching item images, feature maps, correlation values, and characteristics of the ballistic items and their comparisons. The workstation 100 allows him to input queries and receive responses in display or hard copy format. It generates, maintains, and accesses databases of ballistic item images and features and information annotated by the user. It also includes a highlighter function which allows examiner to designate features of interest in an unknown ballistic item, for matching against a database. The highlighter can utilize a light pen, touch screen display, graphics tablet, or other interactive device.

16. For Visible image matching, the apparatus also includes a video microscope with matching lenses to the IR microscope, and a database of visible images.

17. Image processor subsystem acquires images from the cameras including either direct digital output or digitized analog output of the infrared and visible cameras. It standardizes image orientation including rotation, translation, and alignment based upon features in the image.

DETAILED DESCRIPTION OF THE FIRST EMBODIMENT

Figure 1A:
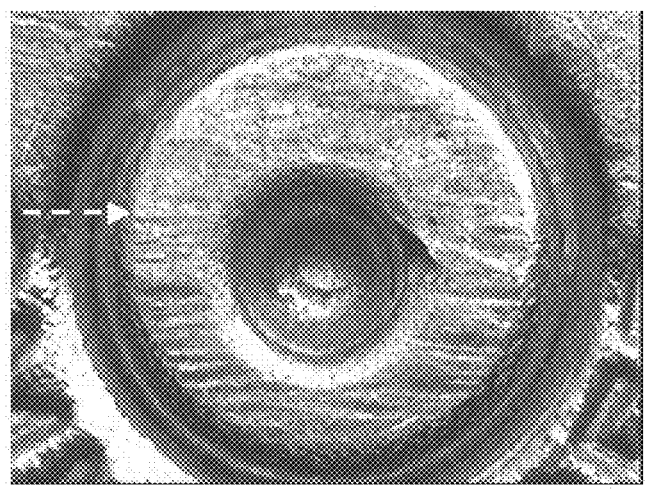
FIGS. 1A, 1B, and 1C are visible images of the primer areas of sibling casings. The image illustrate the effects of illumination variations and artifacts. In particular, the firing pin indentations in the centers lack any details, and each shows glint from the illumination. Each image is oriented based upon the breech face marks and the position of the firing pin indentation. 1a has the best detailed primer area. The illumination of 1b causes much of the breech face markings to be lost, and reverses the appearance of the feature at 10:00 from a white to a dark line inside a grey area. The firing pin indent also appears smaller than in a. In c, a slight variation in the illumination angle make the firing pin indentation appear to be raised up instead. Turning the image upside down makes it appear to be an indentation; however then the position of the indentation is incorrect. Depending on the match engine, these siblings may not be detected as matches based upon these visible images due to the illumination-induced variations.
Figure 1B:
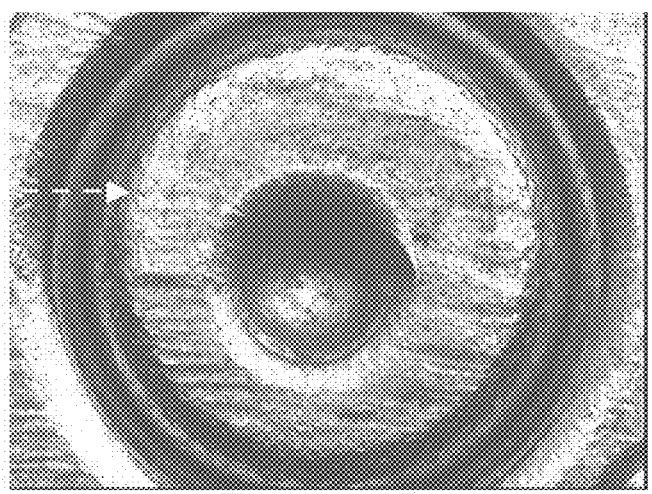
Figure 1C:
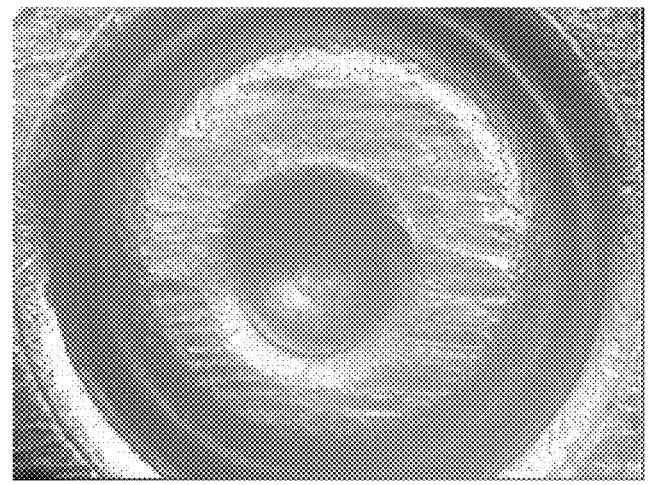
Figure 2:
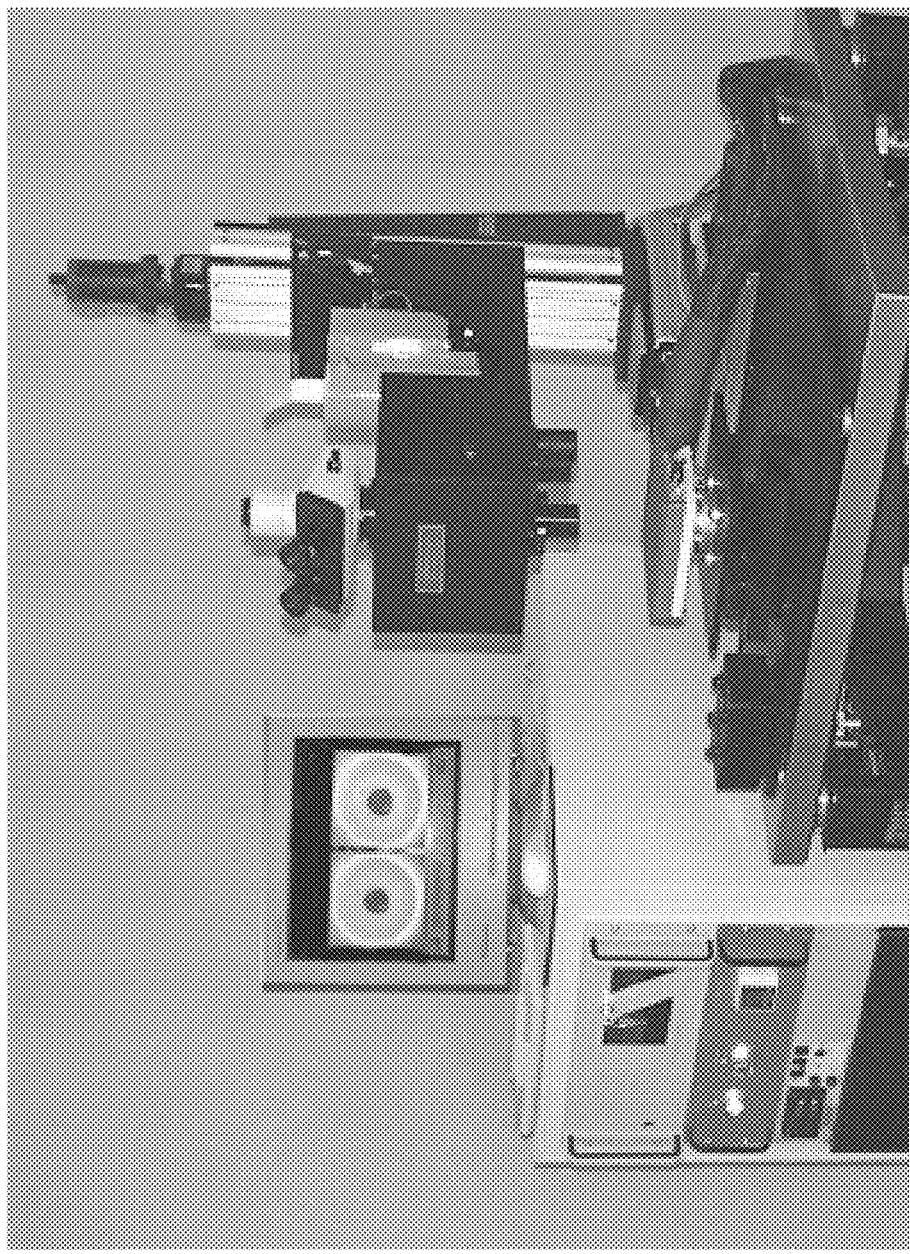
FIG. 2 shows the apparatus for a dual band IR/visible imaging and matching ballistic identification system. The split screen shows two IR images being compared. A four-way split screen can display the corresponding visible images also at the same time.
Figure 3:
FIG. 3 is an infrared image of a shell casing end clearly showing the manufacturers marks and weapons-related marks. This item was heated to 105° F.
Figure 4:
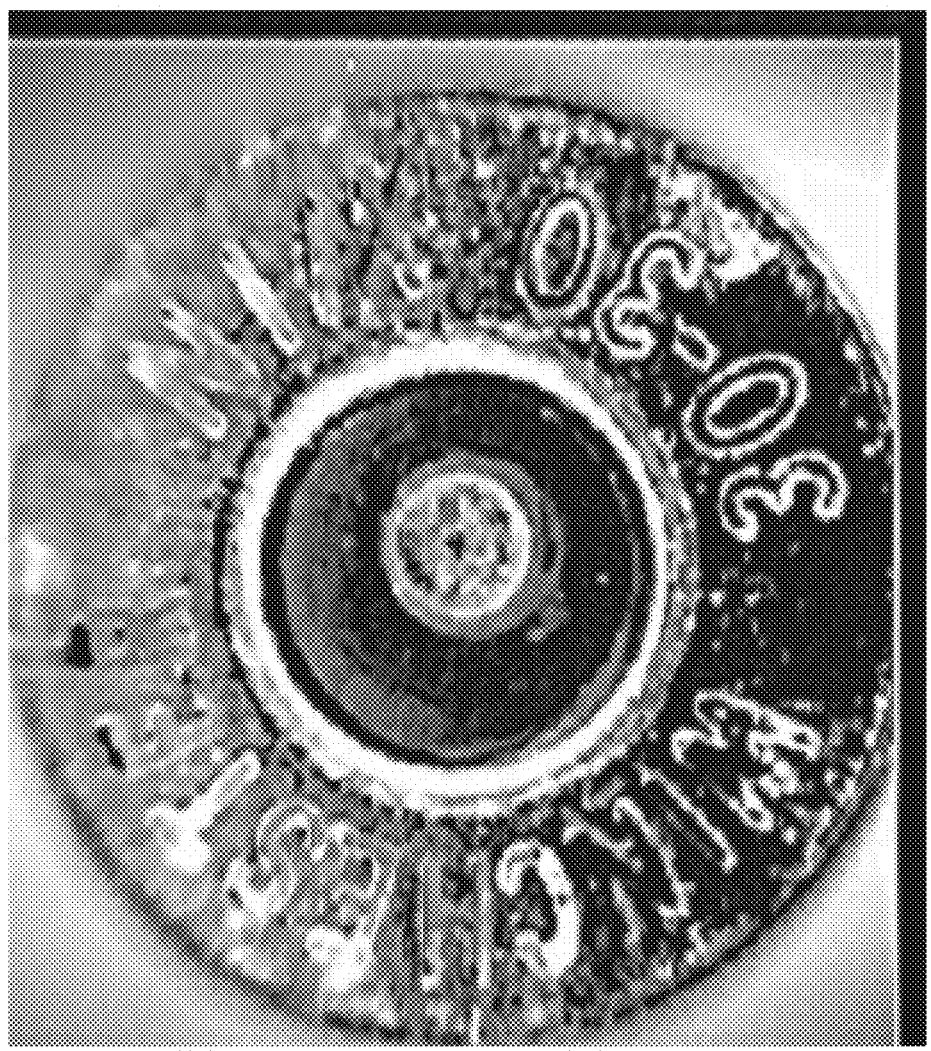
FIG. 4 is an infrared image of a shell casing end at ambient temperature, with focus set to best detail the firing pin indentation.
Figure 5:
FIG. 5 is an infrared image of the edge of a shell casing at ambient temperature, with focus set for an ejector mark.
Figure 6:
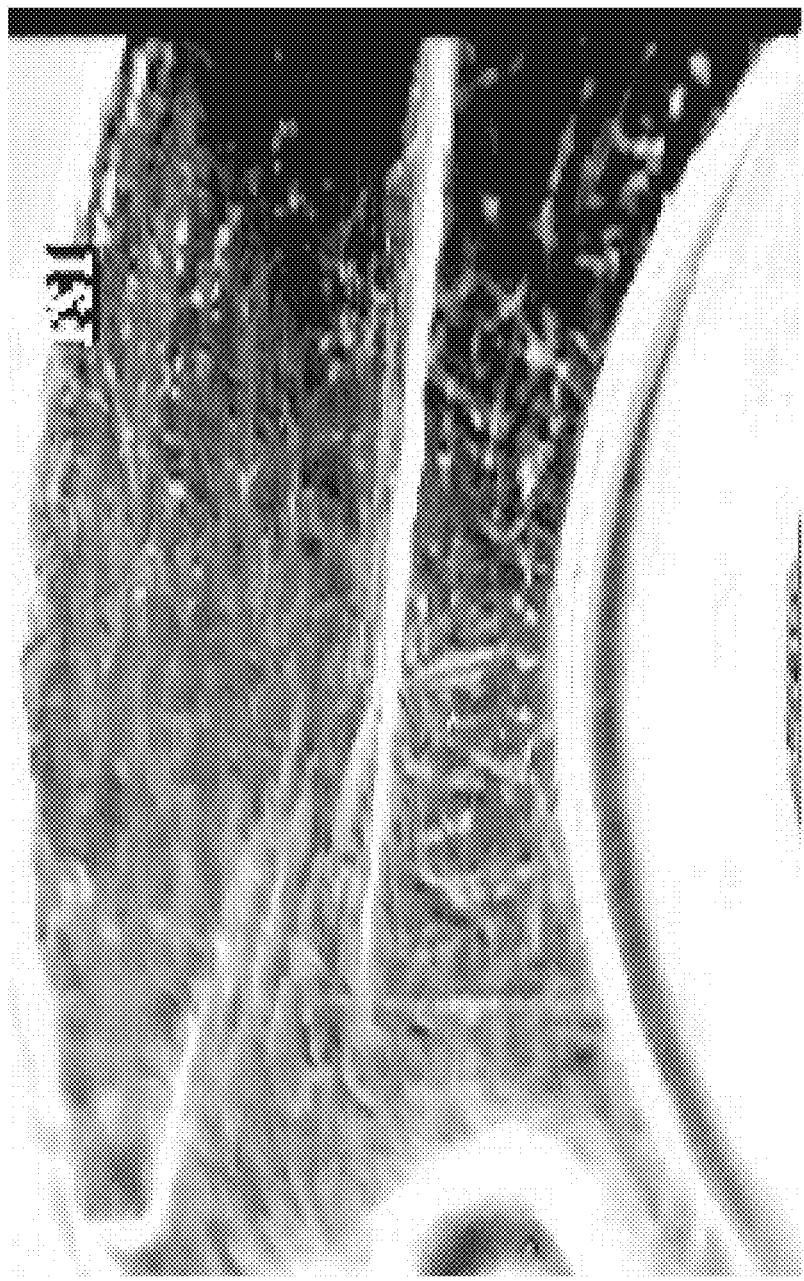
FIG. 6 is an infrared image of a shell casing at ambient temperature, with focus set for a distinctive tool mark.
Figure 7:
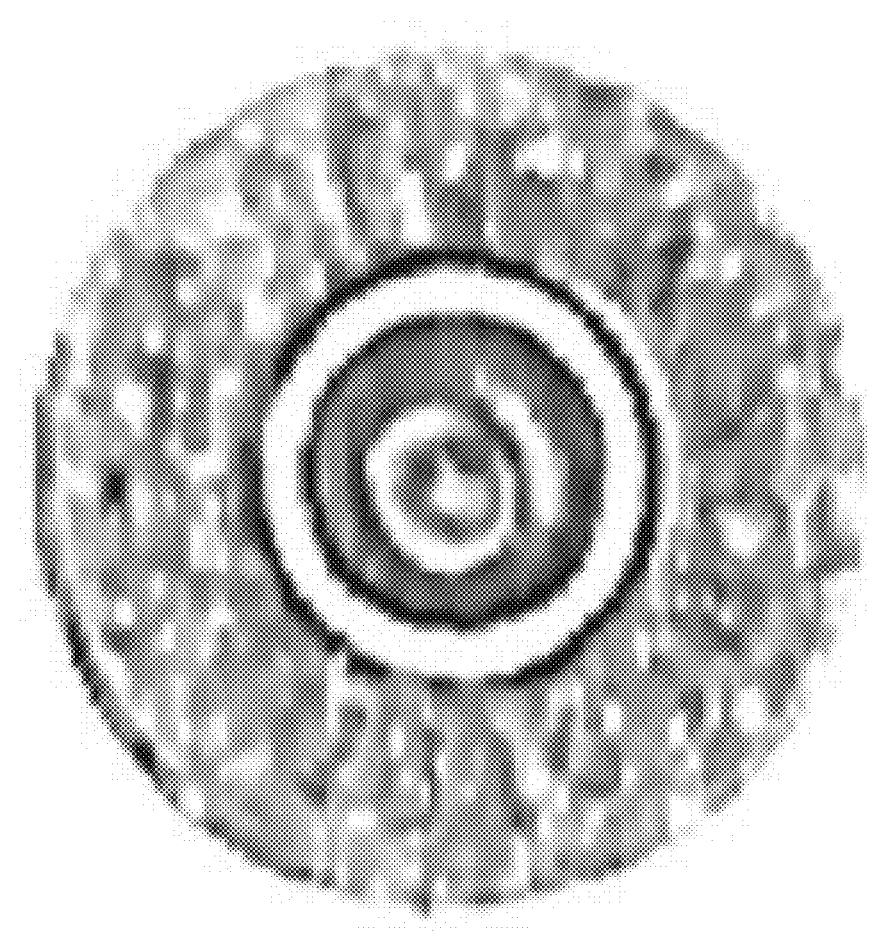
FIG. 7 is an infrared image of a shell casing at ambient temperature, with focus set for a distinctive tool mark in the primer area.
Figure 8:
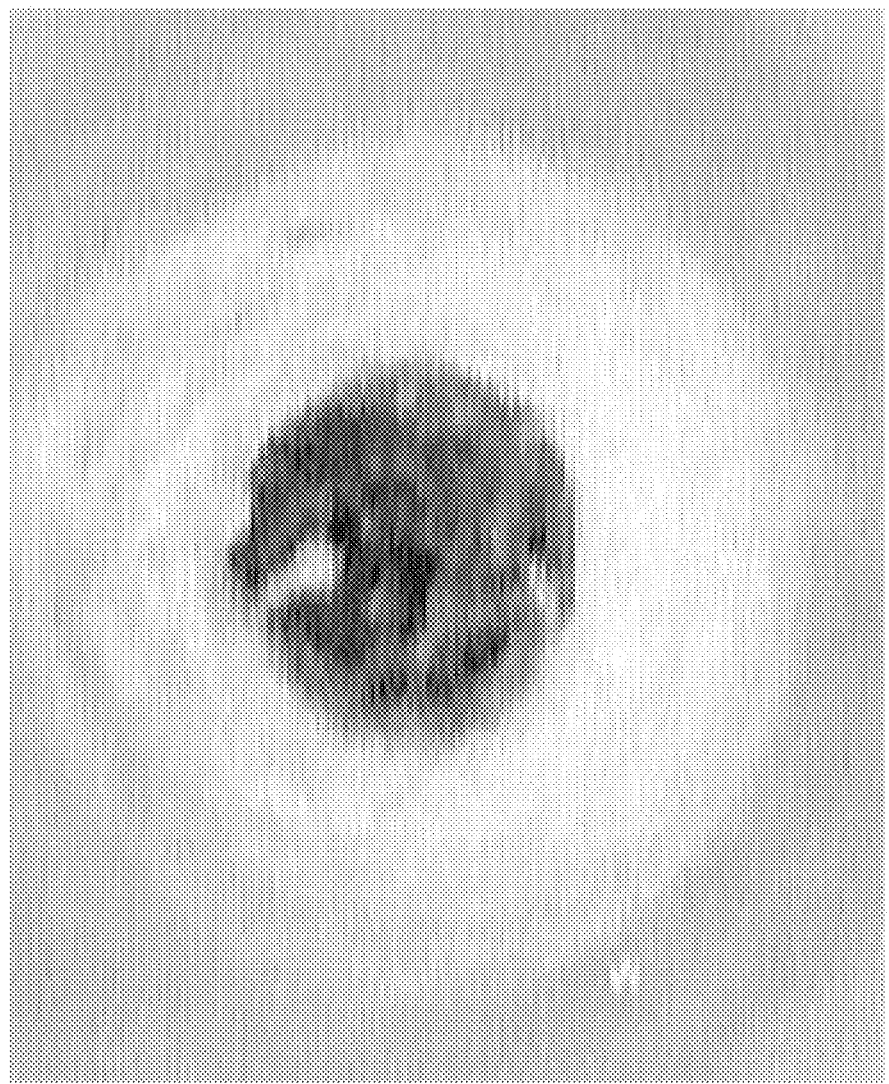
FIG. 8 is a magnified infrared image of the firing pin indentation in a shell casing at room temperature.
Figure 9B:
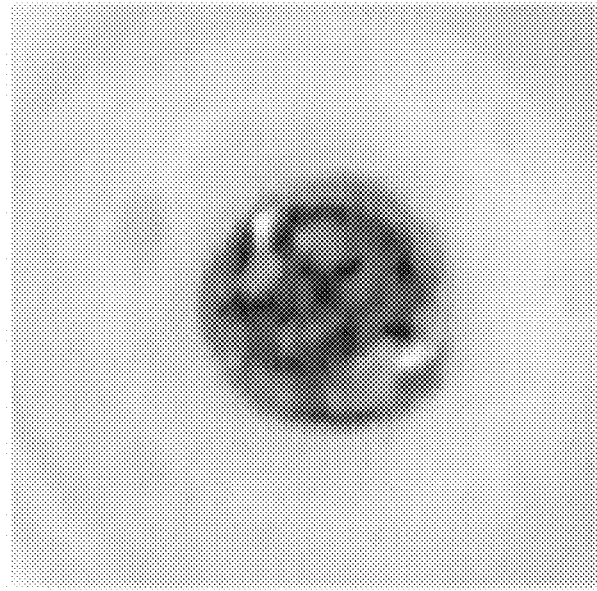
FIGS. 9A and 9B are magnified infrared images of firing pin indentations of siblings.
Figure 9A:
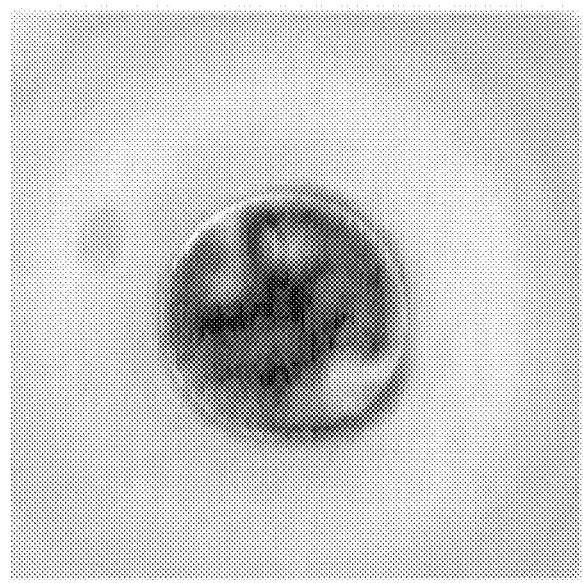
Figure 10B:
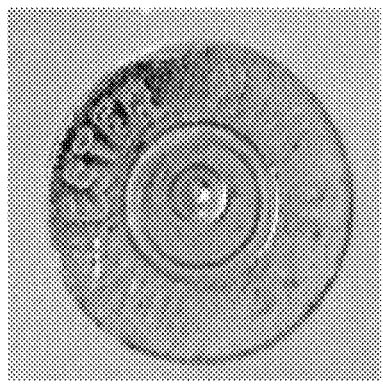
FIG. 10A, 10B, 10C, and 10D show the resulting infrared images of shell casings at differing temperatures. Certain features are more apparent at different temperatures.
Figure 10D:
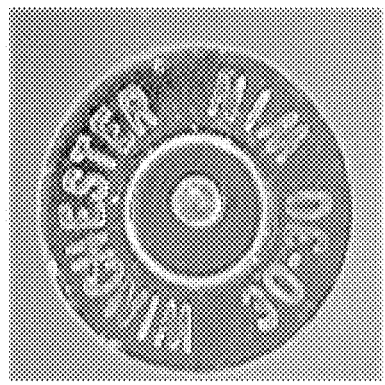
Figure 10A:
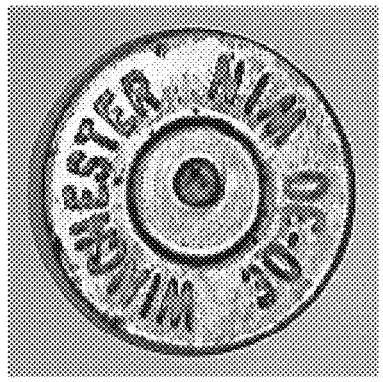
Figure 10C:
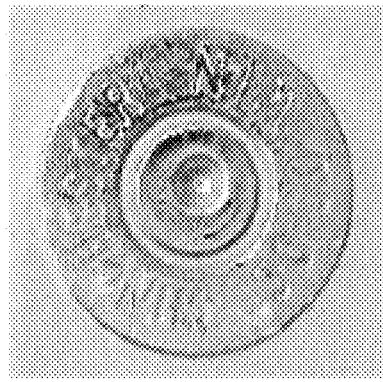
Figure 11B:
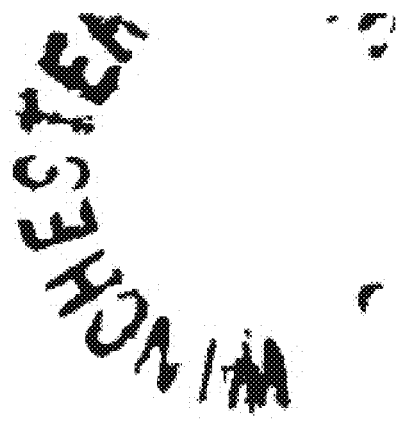
FIGS. 11A, 11B, and 11C illustrate the removal of the manufacturers markings from the casing image prior to matching.
Figure 11A:
Figure 11C:
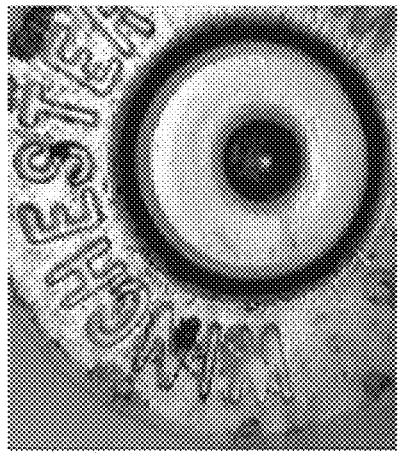
Figure 12:
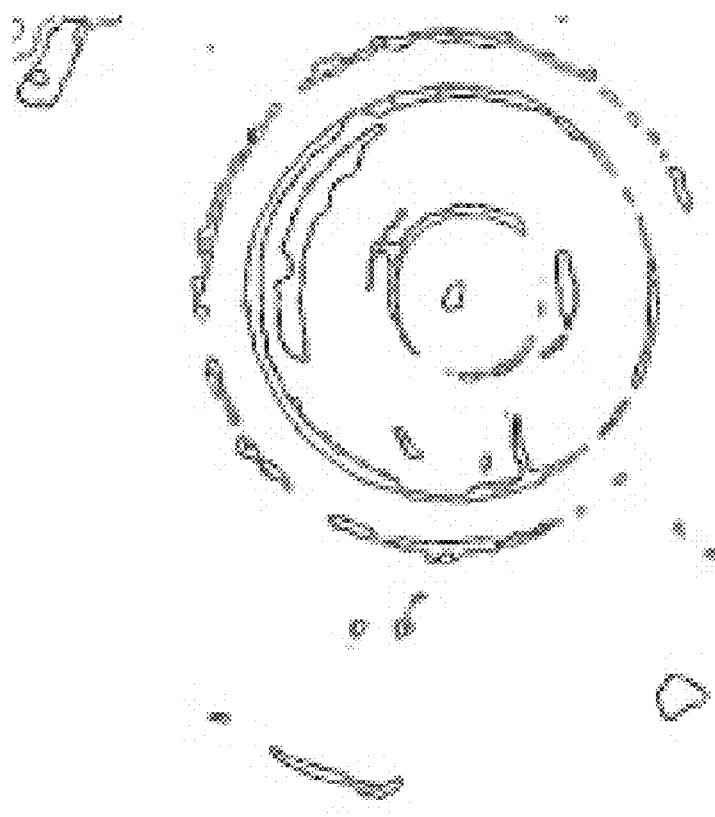
FIG. 12 illustrates minutiae obtained from FIG. 11. In this example, minutiae were defined as pixels whose nearest neighbors had grey values differing by more than 8 gray levels. Matching can be performed based upon the minutiae, analogous to matching of fingerprint minutiae.
Figure 13:
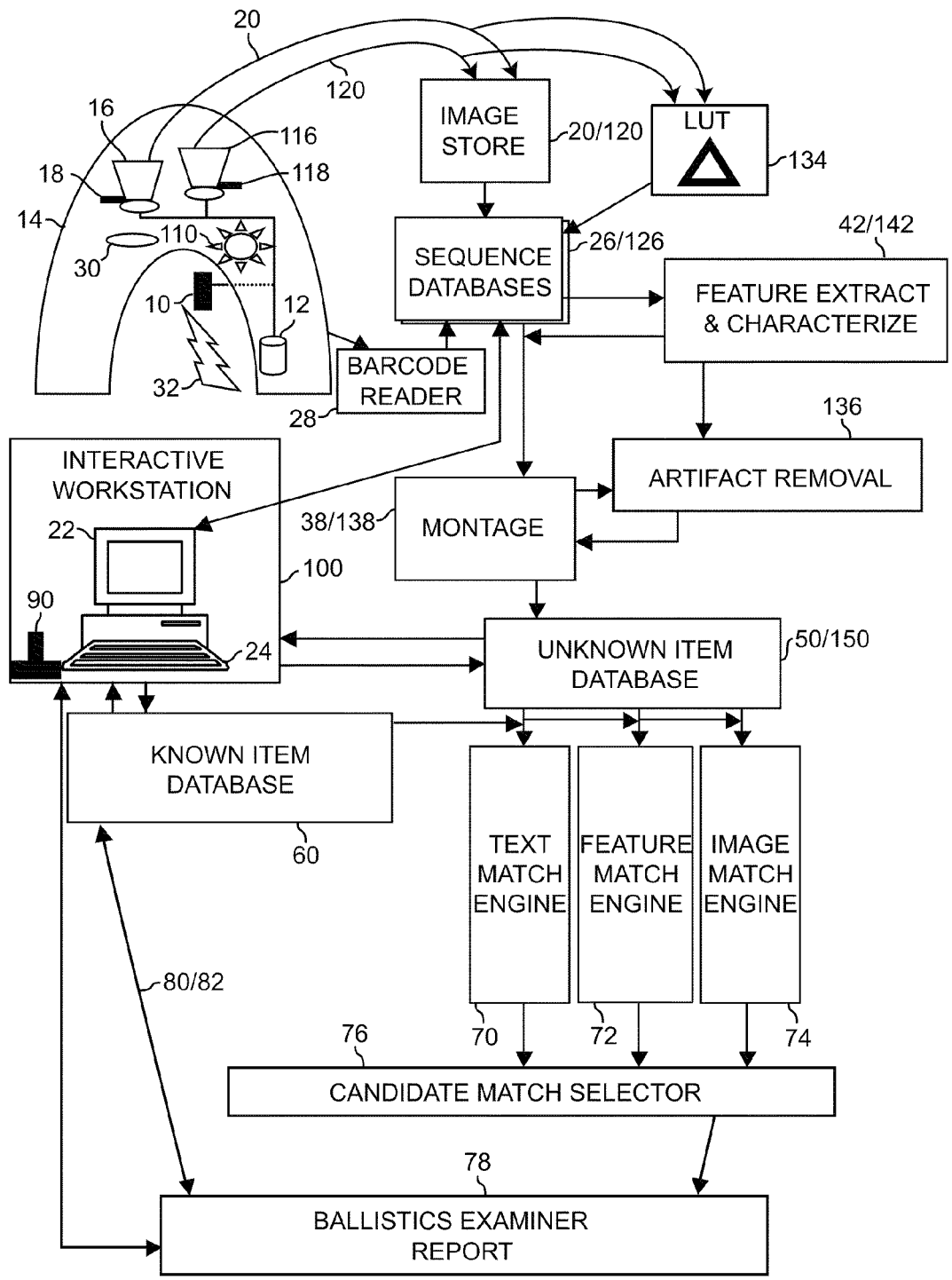
FIG. 13 presents a block diagram of the apparatus configured with the following subsystems.

Using Infrared Images to Refine Visible Image Details for Ballistics Identification Image and Information Capture As shown in FIG. 13, a ballistic item 10 is placed in a holder 12 and surrounded by a shroud 14 covering it and an infrared camera 16 such that external lighting and heating sources are blocked. The camera focus mechanism 18 is varied over a range such that all details of the infrared image of the ballistic item are clearly captured in a sequence of infrared images 20.

Optionally, one or more spectral filters 30 can be installed and additional sequences of infrared images obtained. Optionally, a heater 32 can be used to raise the temperature of the ballistic item and additional sequences of infrared images obtained for the item at the elevated temperature and as it cools.

A controlled light source 110 is then turned on to illuminate the ballistic item and a video camera 116 is used to produce a sequence of visible images 120 by varying the focus mechanism 118.

Each image is annotated with date and time, workstation #, item temperature, focus setting, and item reference number. The focus and image capture processes can be automated such that a succession of minute variations in focus is performed and an image taken at each step, or the focus and image capture can be manually controlled using an examiners workstation 100 consisting of a display screen 22 and input controls 24 including any combination of keyboard, mouse, voice, or similar device. The workstation 100 also contains highlighting device 90 for manually specifying areas of images or textual information of particular interest to the examiner. The highlighter can be any combination of touch screen, lightpen, graphics tablet, or similar device. The display has the ability to mosaic several infrared 20 and visible 120 images on a single screen.

Text information is entered which identifies the ballistics item and related information such as case #, weapon type, ammunition type, location where found, etc. That information can be read from an evidence tag using a bar code reader 28 or input through the controls of the examiners workstation 100 such as by keyboard. The text information can be displayed on the screen 22 along with the corresponding annotated image.

Both text information and image sequences are stored in an infrared image sequence database 26 and a visible image sequence database 126.

Feature Extraction and Characterization

The sequences of visible images are processed to extract and characterize apparent features at 142 using any of various standard automated image processing techniques or by manual highlighting by the examiner. Characterization a minimum includes the relative positions of features, their shape, their area and perimeter length, and variation in gray scale distribution within the feature. Similar processing is performed at 42 on the infrared sequences using the same or similar processing.

For each visible feature, one image is selected from the sequence in which that feature is in sharp focus. The feature area of that image is extracted and used to create a montaged visible image 138 in which each feature is shown and each is in sharp focus. The same is done for the infrared sequence to create a montaged infrared image 38. Each montaged image is associated with the characterizations of the associated features at 42 and 142.

Image Comparison and Corrections to Visible Images

The characteristics of the montaged visible image 138 and montaged infrared image 38 are compared at 136. Any feature of the visible montaged image 138 which does not have a corresponding infrared montaged feature in image 38 is removed from image 138. Correspondence requires at a minimum overlapping locations and similar shapes. Those removed visible features are considered to be illumination-induced artifacts. Any visible feature which has a corresponding infrared feature, but which differs in gray scale distribution from the IR feature is subjected to variation in its gray scale allocation or LUT 134 to find the best correlation with the corresponding infrared feature. Those visible features are considered to have illumination-induced gray scale reversals. Any infrared feature which does not have a corresponding visible feature is considered to represent a possible true feature hidden in the visible image due to shadow. At the option of the examiner, such features can be (1) copied from the infrared montaged image to the visible montaged image, (2) annotated such as in color on the visible montaged image, (3) tested by the use of spectral filters and/or heating to determine if it results from residue, in which case the item should be cleaned and re-imaged.

The resulting montaged infrared and visible images, along with their characteristics and textual information are entered into a database of infrared characterizations 50 and enhanced visible characterizations 150 of unknown ballistic items. The enhanced visible characterization can then be used with current ballistic identification methods and apparatus, producing more accurate results due to the elimination of illumination-induced artifacts, and the detection of hidden features due to shadow.

Detailed Description of the Second Embodiment

Ballistics Identification Through Matching Infrared Characteristics

When infrared imaging alone is used for ballistics identification, without use of corresponding visible images, then components 116, 118, 120, 126, 138, 142, 134, 150 and references to visible images, sequences, features, and montages can be eliminated from the apparatus description.

Image and Information Capture

A ballistic item 10 is placed in a holder 12 and surrounded by a shroud 14 covering it and an infrared camera 16 such that external lighting and heating sources are blocked. The camera focus mechanism 18 is varied over a range such that all details of the infrared image of the ballistic item are clearly captured in a sequence of infrared images 20.

Optionally, one or more spectral filters 30 can be installed and additional sequences of infrared images obtained. Optionally, a heater 32 can be used to raise the temperature of the ballistic item and additional sequences of infrared images obtained for the item at the elevated temperature and as it cools.

Each image is annotated with date and time, workstation #, item temperature, focus setting, and item reference number. The focus and image capture processes can be automated such that a succession of minute variations in focus is performed and an image taken at each step, or the focus and image capture can be manually controlled using an examiners workstation 100 consisting of a display screen 22 and input controls 24 including any combination of keyboard, mouse, voice, or similar device. The workstation 100 also contains highlighting device 90 for manually specifying areas of images or textual information of particular interest to the examiner. The highlighter can be any combination of touch screen, lightpen, graphics tablet, or similar device. The display 22 has the ability to mosaic several images on a single screen.

Text information is entered which identifies the ballistics item and related information such as case #, weapon type, ammunition type, location where found, etc. That information can be read from an evidence tag using a bar code reader 28 or input through the controls of the examiners workstation 100 such as by keyboard. The text information can be displayed on the screen 22 along with the corresponding annotated image.

Both text information and image sequences are stored in an image sequence database 26.

Feature Extraction and Characterization

The sequences of infrared images are processed to extract and characterize apparent features at 42 using any of various standard automated image processing techniques or by manual highlighting by the examiner. Characterization at a minimum includes the relative positions of features, their shape, their area and perimeter length, and variation in gray scale distribution within the feature.

For each apparent infrared feature, one image is selected from the sequence in which that feature is in sharp focus. The feature area of that image is extracted and used to create a montaged infrared image 38 in which each feature is shown and each is in sharp focus. If there is the chance that debris may remain on the ballistic item, then apparent features may in fact be debris. This event can be tested for by comparing corresponding focus images using different spectral filters 30. Apparent features which persist through a range of filters are considered actual features. Each montaged image is then associated with the characterizations of the associated features at 42.

Identification Using Matching

When the unknown ballistic item characterized in 50 has been identified or linked with other known items, by a ballistics examiner or an automated system, its file is move to relational database 60 which then includes (1) textual information related to the case, its disposition, location of the item, names and dates, weapon information and links to other forensic and law enforcement databases; (2) images which may include the montaged feature images alone or also the image sequences, and may also include highlights created by a ballistics examiner and corresponding notes, which should be displayed in color for emphasis; and (3) feature characteristics including a summary of the number and types of features seen, and details on each feature including type, shape, size, location, and variation in gray scale and edge effects.

Database 60 will contain characterization of known or linked ballistic items. When an unknown item 10 is presented for identification, it is processed as detailed above to produce its characterization at 50. The resulting characteristics are used to select initial candidates from the database 60 based upon text, image, and feature characteristics which are relatively immune to error or variation. For example, the calibre of ammunition. In matching shell casings, if the unknown firing pin indentation is centered, only database entries with centered firing pins are considered as potential candidates. The presence or breech face markings, ejector or extractor marks may also be considered relatively immune to error or variation.

The initial candidate matches are then further processed using the text matching engine 70 which might provide for example the date of manufacture of the weapon, meaning that all ballistic items collected prior to that date need not be considered as matches. Other information is compared and scored as to similarity, such as information about the type of crime associated with the ballistics item, the locale where the item was collected, the presence of other similar items at the same collection, etc. The similarity score will generally not exclude candidates from further consideration, but may influence their rank ordering in presentation to a ballistics examiner for consideration below.

Remaining candidate matches are then further processed using the feature matching engine 72 which first compares summary characteristics such as the number and type of features, and then compares the details of each feature of the unknown and candidate items. Various metrics or scoring techniques can be defined to calculate a goodness of match based upon the feature characteristics. Fingerprint matching and face matching technique are especially suitable, with Prokoski et al. U.S. Pat. No. 5,163,094 as an example. Candidates which do not correlate sufficiently with the unknown item are not longer considered.

Remaining candidate matches are then further processed by correlating the montaged images using an image processing technique such as Prokoski U.S. Pat. No. 6,173,068 to produce an image correlation value. Other image processing comparison techniques may be used.

The remaining candidates are then rank ordered based upon their text similarity score, their feature characteristics goodness of match, and their image correlation value. Various algorithms for performing the rank ordering can be used. An effective one is to assign a rank ordering based on each of the three measures, and then perform a composite rank ordering based upon the ordinal sum of the component rank orderings.

For various reasons it may be desirable to use only one or two of the three comparison techniques.

The top placing candidates are presented to the ballistics examiner for review on the display 22. Using interactive controls 24 he can manipulate the imagery to perform further visual matching of simultaneously displayed unknown and candidate text, feature characteristics, and imagery. His decision 78 for each candidate is either that it is a match or is not a match for the unknown item, and the information in database 50 is transferred to database 60. When he determines that a match has occurred, then he indicates through the control mechanism 24 that the previously unknown item is now linked to a particular candidate 80, If he exhausts the top placing candidates, he then indicates that the unknown item has no match 82 in the existing database as of the current date.

Detailed Description of the Third Embodiment

Automation of Toolmark Identification

The original application, now U.S. Pat. No. 7,068,808, continued in U.S. patent application Ser. No. 11/319,230, specified the use of infrared imaging to capture emissivity variations induced on surfaces by the creation of toolmarks. This continuation in part specifies the use of variations in spectral emissivity within a wavelength band and temperature range selected to match the characterizing toolmark features. Infrared images display apparent temperatures that are the product of actual temperature and emissivity at each pixel location. Infrared images in which the actual temperature is uniform across the image are therefore images of emissivity differences only. Most metals and various other materials have emissivities that vary strongly with wavelength. To emphasize that infrared toolmark images contain no temperature variations they may be referred to as "spectral emissivity maps". When wavelength is a factor in the image, it is specified as part of the toolmark identifier.

The use of fixed focus optics having shallow depth of focus, driven by very precise CNC positioning, produces sequences of image frames from which precise 3D surface models can be generated automatically. The ability to automate toolmark imaging and metrology provides a level of consistency that cannot be matched by imaging that requires any subjective human intervention. This continuation in part includes these additional points of novelty: a) computer numerically controlled (CNC) positioning of the toolmark relative to the imaging sensors to maximize reliability of resulting images and their comparisons; b) use of a fixed focus IR camera to collect a precision frame sequence for each toolmark as the focus distance and orientation of the toolmark is varied by CNC control; c) extended focus 2D images and 3D surface models are generated automatically from the CNC controlled image sequences; d) the optional feature of using barcoding of toolmarked items to facilitate automatic batch processing.

Components of ATIS 1.0 Toolmark Imaging Subsystem

1.1 CNC Position Controller

A numerically-controlled mill or lathe in which an emissivity sensor replaces the cutting head is the major component of the ATIS Imaging Subsystem. At a minimum, the CNC controls include precision adjustment to the focus distance between the sensor and toolmark. Controls can optionally include adjustments to tilt the sensor relative to its axes or those of the toolmarked item.

Optionally, CNC controls also move the toolmarked item holding mechanism away from the sensor for ease in loading it, automatically homes the sensor and zeros the CNC accumulated position, automatically rotates and translates the toolmarked item into a standard pose and position, automatically controls movement of the item in synchronization with the sensor operation, and maintains accurate accumulated movement counts to minimize position error.

Optionally, two or more sensors can be controlled in succession by the same CNC operation with accurate handoff and synchronization for successive imaging at two sensor locations. Examples are: Two emissivity sensors with different optics can use a larger field of view first station sensor to standardize item or toolmark orientation and position relative to landmarks that are not seen within the higher resolution second station sensor's field of view. A visible light imager or other type sensor can be in one sensor position to collect corresponding images or utilize information from that sensor. Precise extrinsic calibration of the two sensors is essential.

Optionally, adjustments for speed of sensor movement between image cycles, speed of item movement between image cycles, data collection imaging rate, and other parameters are available to minimize transmission to the images of vibration and blur from motion as well as other characteristics of the recorded image data.

1.2 Toolmarked Item Holder

A mechanism is used for holding the toolmarked item within the field of view of the sensor. The mechanism has the necessary degrees of freedom and interface to permit CNC adjustment to orientation and position relative to the sensor. When two or more sensors image the toolmark in succession, the holder has the means to be repositioned to each sensor and to be homed at the conclusion of imaging.

1.3 Emissivity Sensor

An infrared imager and optic is selected based on size of identifying toolmark features, substrate material, ambient temperature, imaging distance, and other operational considerations. Imager outputs sequences of images at constant time intervals.

1.4 Sensor Mount

A mechanism is used for holding the sensor in position to view the toolmark. The mechanism has the necessary degrees of freedom and interface to permit CNC adjustment to orientation and position relative to the toolmark.

1.5 Recording Means

Means are provided for starting, stopping, and recording emissivity images from the sensor under CNC control.

1.6 Loading and Unloading Means

Toolmarked item is placed into its holder and removed after imaging is complete either by manual or automated procedures.

1.7 Utilities

Power, power conditioning, access control, data processor, image storage database, backup power, status alarms and other provisions required for the intended use of the Image Collection Subsystem are provided.

1.8 Software, Firmware, and Manual Controls

Provisions for set-up, calibration, operation, test, repair, and shutdown of each component are provided.

1.9 Optional Secondary Sensors

Additional sensors can include spectral emissivity imagers and other types of sensors that can be controlled by the CNC and calibrated against the primary sensor.

2.0 Toolmark Image Identification Subsystem

A Toolmark image is considered identified when it is found to be sufficiently similar to a previously collected image from known source. In general, one target image is compared in succession to a database of known source images. This subsystem can be integrated with the Imaging Subsystem or can be separate. It has the following components:

2.1 Means to access recorded sensor data representing a Target Toolmark Image and a Database of Known Source Toolmark Images 2.2 Means to extract identifying features from recorded sensor data 2.3 Means to generate templates for comparison of images 2.4 Means to compare templates and generate a correlation value 2.5 Means to assign a Match Value to a pair of images 2.6 Means to Rank Order a Database of Images according to their Match Values relative to a given target image 2.7 Means to output the Rank Ordering with computed Match Values and image identifiers 3.0 Examiner's Workstation for Review of Toolmark Images

3.1 Means to Access Output of Toolmark Identification Subsystem

Examiners can review the rank ordered match results from the Toolmark Image Identification subsystem at a computer workstation that communicates with the Image Identification subsystem either directly or indirectly. Alternately, this review function can be included within the Image Identification subsystem.

3.2 Image Manipulation and Comparison and Report Generation

Provisions are included to simulate manual operation of a compound stereo microscope for aligning two images and viewing their differences. Provisions are provided for annotating the results from the automated identification rank ordering, eliminating candidate matches from the rank ordering, adjusting the rankings, changing displayed image sizes, annotating images, displaying arrays of candidate images, and producing evaluation reports including annotated images.

3.3 Optional Means to View Images from Secondary Sensor

Provisions are included to display imagery from a secondary sensor in place of, or blended with, the primary sensor imagery 4.0 Optional Examiners Workstation for Physical Comparison of Toolmarks As an option, components of the Imaging and Review Subsystems are combined in a dedicated workstation used for manual verification of image matches by simultaneous re-imaging of the two physical toolmarks. Functions will simulate the look and feel of a comparison microscope. Components include:
- 4.1 Imaging Subsystem with twin spectral emissivity collection sensors
- 4.2 Provisions for manually loading two toolmarked items
- 4.3 Interactive controls to automatically position the two items for maximum correlation of corresponding toolmarks
- 4.4 Provisions for realtime display of emissivity images from both sensors
- 4.5 Optional Additional features include: a) manual selection of a toolmark element on one item for which the system automatically repositions the second item to locate, image, and display the best matching element on the second item, b) zoom control of display sizes; c) presentation mode in which the system displays a sequence of corresponding features in the two toolmarks while automatically positioning the items.

Preferred Embodiments for Automated Toolmark Recording and Identification

Emissivity mapping of toolmarks can be used as a self-generated product identification code to avoid the cost and complexity of applying an identifier to a manufactured item. Toolmark E-maps can be used to trigger just-in-time maintenance by providing a means to monitor wear, deflection, vibration, erosion, pitting, fouling, breakage, and other changes to a tool used in manufacturing. Toolmark recordings made during the manufacturing process can be used to assess or predict the quality of the finished item; automatically binning the item and reporting the type of defect by comparison against a database of toolmarks associated with known defects such as: improperly cured substrate, incomplete coating, incorrect temperature, wrong feed angle. Toolmark derived information can be automatically reproduced on accessible surfaces of a manufactured part, its label or packaging, to provide authentication and backwards traceability.

High value manufactured items, including military hardware, coinage, and limited edition jewelry and sculpture reproductions can be authenticated, or detected as counterfeit through comparison of toolmark E-maps with those from authorized manufacturing sources.

Depending on the application, toolmark E-map recording and/or assessment can be integrated into a manufacturing process or performed on an as-needed basis such as when a manufactured item fails during use. The principal advantages of using toolmarks for the suggested applications are cost and speed of manufacture; no labels, marking inks or laser etching need be incorporated into the manufacture. The principal advantages of using emissivity mapping to represent a toolmark are that it is essentially independent of ambient conditions and so requires no modification to a manufacturing process other than inserting an emissivity sensor to image the toolmark. For episodic uses, the reliability of automated toolmark E-maps collection, simplicity of deriving class features, and robust uniqueness of each tool's individual toolmark characteristics on a broad array of substrates provides the lowest cost, simplest, and most accurate technique known for identification, authentication, and assessment of manufactured items.

Modular design of ATIS can accommodate various size and shape toolmarked items, and allows selection of an emissivity sensor based upon the substrate material and characteristics to be recorded. Programmed control of toolmark position and sensor operation is tailored to the sensor, substrate, and toolmark characteristics in a particular application.

Comparison of emissivity maps can be performed within ATIS or by a separate processor associated with files to be compared. Various algorithms can be employed to configure files, make comparisons, and rank the results. These can include processes for: standardizing and normalizing, registration and alignment, feature extraction, template construction, encoding and transforms, comparison, match value assignment and ranking of multiple comparisons.

Spectral emissivity maps for different spectral bands can be combined for the same toolmark and then compared against similar compositions for other toolmarks. Emissivity maps can also be compared to other 2D and 3D representations of toolmarks, including visible light images, scanning electron micrographs (SEM), and Nipkow-disk confocal microscope 3D representations.

Knowing properties of the surface (including its material composition, topography, texture, processings and coatings applied) and the geometrical relationship between camera and surface at each point in the resulting image, a predictive model can be developed that relates a given tool and its method of contact to the resulting toolmark as recorded by the infrared camera. The repeatability and predictability of infrared toolmark images provides additional scientific basis for toolmark identification.

In addition to automated capture of reliable toolmark images, processing methods incorporated into the ATIS provide rapid visualization of toolmarks as 3D topographic models, and fast comparison against databases of toolmark images to locate those with sufficient similarities to be further considered as possibly created by the same tool.

Methods for performance evaluation of the ATIS system in toolmark identification tasks were adopted from Receiver Operating Characteristic (ROC) analysis of decision systems.

ATIS functions include rapid fully-automated toolmark positioning, infrared imaging, and database comparison. That enables large volume collection of test images, and sensitivity testing of system performance under many variations using sufficiently large sample populations to establish valid statistical performance measures.

While the invention has been described in terms of preferred embodiments, those skilled in the art will recognize that the invention can be practiced with modification within the spirit and scope of the appended claims.

I claim:

1. Method for estimating the volume of groves, indentations and striations in ballistic items comprising the steps of:
heating the ballistic item to an elevated temperature;
measuring the mean temperature of the item using a radiometric infrared camera;
capturing a sequence of images as the item cools;
capturing for each image the mean temperature using the radiometric camera; and
estimating the volume of each depressed feature by determining its heat loss rate relative to the mean temperature of the item, considering also the materials composition of the item.

2. A computer implemented method for automating toolmark identification, the computer performing the steps of:
positioning a toolmark relative to one or more imaging sensors, the positioning being sufficiently precise to enable the imaging sensors to produce a sequence of image frames from which replicable three dimensional (3D) surface models of the toolmark can be generated;
varying a focus distance and orientation of at least one of the imaging sensors producing said sequence of image frames, the at least one imaging sensor using a fixed focus optics having shallow depth of focus;
generating 3D surface models of the toolmark from the sequence of image frames; and
comparing said 3D surface models of the toolmark with a database of known toolmarks to identify a matching toolmark.

3. The method of claim 2, wherein said precise positioning is implemented using a computer numerically controlled device.

4. The method of claim 3, wherein the computer numerically controlled device is a numerically controlled lathe in which an emissivity sensor replaces the cutting head.

5. The method of claim 2, further comprising generating extended focus two dimensional (2D) images from the sequence of image frames.

6. The method of claim 2, further comprising barcoding of the toolmark.

* * * * *